(12) United States Patent
Shimada et al.

(10) Patent No.: US 7,590,512 B2
(45) Date of Patent: Sep. 15, 2009

(54) SYSTEM AND METHOD FOR DEFORMATION ANALYSIS USING INVERSE PRE-DEFORMATION OF FINITE ELEMENT MESH

(75) Inventors: Kenji Shimada, Pittsburgh, PA (US); Arbtip Dheeravongkit, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 515 days.

(21) Appl. No.: 11/214,077

(22) Filed: Aug. 29, 2005

(65) Prior Publication Data

US 2006/0050987 A1 Mar. 9, 2006

Related U.S. Application Data

(60) Provisional application No. 60/607,916, filed on Sep. 8, 2004.

(51) Int. Cl.
*G06F 17/10* (2006.01)
(52) U.S. Cl. .................... 703/2; 345/419; 345/421; 345/420; 345/581; 345/441
(58) Field of Classification Search .............. 345/420, 345/419, 421; 703/2; 702/42, 182; 714/37
See application file for complete search history.

(56) References Cited

U.S. PATENT DOCUMENTS 6,256,038 B1 * 7/2001 Krishnamurthy ............. 345/419
6,573,892 B1 * 6/2003 Yang et al. .................. 345/421
2003/0080957 A1 * 5/2003 Stewart et al. .............. 345/420
2003/0225553 A1 * 12/2003 Brombolich ................... 703/2
2004/0195439 A1 * 10/2004 Hamamoto et al. ........... 244/72
2004/0254745 A1 * 12/2004 Miyamoto et al. ............ 702/42
2005/0004779 A1 * 1/2005 Ueda et al. .................. 702/182
2005/0075847 A1 * 4/2005 Yamada et al. ................ 703/2
2006/0058985 A1 * 3/2006 Arslan et al. .................. 703/2
2006/0288255 A1 * 12/2006 Kikuchi et al. ................ 714/37

OTHER PUBLICATIONS

H.A. Eschenauser, V.V. Kobelev, A. Schumacher Buble method for topology and shape optimization of structures Structureal Optimization 8, pp. 42-51, Springer-Verlag, 1994.*

Soon Wan Chung and Seung Jo kim A remeshing algorithm based on bubble packing method and its application to large deformation problems Finite Elements in Analysis and Design 39, pp. 301-324, 2003.*

(Continued)

*Primary Examiner*—Kamini S Shah
*Assistant Examiner*—Cuong V Luu
(74) *Attorney, Agent, or Firm*—K&L Gates LLP (57) ABSTRACT

Finite element analysis methods and computer systems for analyzing deformation to an object are disclosed. According to various embodiments, the method includes the steps of: (1) performing a partial analysis on the object to generate a deformed boundary for the object from an undeformed boundary for the object; (2) generating a first deformed input mesh for the object based on the deformed boundary; (3) mapping node locations from the first deformed input mesh to the undeformed boundary for the object; and (4) performing an analysis on the undeformed boundary of the object using the first deformed input mesh.

24 Claims, 10 Drawing Sheets

OTHER PUBLICATIONS

G. Li, J.T. Jinn, W.T. Wu, S.I. Oh Recent development and applications of three-dimensional finite element modeling in bulk forming processes Hournal of Materials Processing Technology 113, pp. 40-50, 2001.*

Guo et al. Recent Developments on the analysis and optimum design of sheet metal forming parts using a simplified inverse approach Computers and Structures 78, 2000, 133-148 2000 Civil-Comp Ltd. and Elsevier Science Ltd.*

Stelios K. Kyriacou and Christos Davazikos A Biomechanical Model of Soft Tissir Deformation, with Applications to non-rigid Registration of Brain Imagse with Tumor Pathology The Johns Hopkins University School of Medicine.*

G. Zhao, E. Wright, R. V. Grandhi Computer Aided Preform Design in Forging Using the Invesrse Die Contact Tracking Method Int. J. Mach. Tools Manufact. vol. 36, No. 7, pp. 755-769, 1996.*

Wagoner et al., "Forging Analysis", Metal Forming Analysis, 2001, Chapter 10.

"Quasi-Static Analysis", ABAQUS 6.4, Getting Started with ABAQUS/Explicit, Chapter 7.

"Forging With Sinusoidal Die", ABAQUS 6.4, Example Problems Manual, Chapter 1.3.9.

Shimada et al., "Quadrilateral Meshing with Directionality Control through the Packing of Square Cells", 7th International Meshing Roundtable, 1998, pp. 61-76.

Shimada et al., "Bubble Mesh: Automated Triangular Meshing of Non- Manifold Geometry by Sphere Packing", Third ACM Symposium on Solid Modeling and Applications, 1995, pp. 409-419.

Zienkiewicz et al., "The Super-Convergent Patch Recovery and a Posteriori Error Estimates, Part 2: Error Estimates and Adaptivity", International Journal for Numerical Methods in Engineering, 1992, vol. 33, pp. 1365-1382.

Zienkiewicz et al., "The Super-Convergent Patch Recovery and a Posteriori Error Estimates, Part 1: The Recovery Technique", International Journal for Numerical Methods in Engineering, 1992, vol. 33, pp. 1331-1364.

Heckbert, "Two-Dimensional Mappings", Fundamental of Texture Mapping and Shadding, 1989, Chapter 2.

Gomes et al., "Transformation of Graphical Objects", Warping ad Morphing of Graphical Objects, 1999, Chapter 3.

Souli, "An Eulerian and Fluid-Structure Coupling Algorithm in Ls-Dyna", ASME-PUBLICATIONS-PVP, 1999, vol. 396, pp. 269-274.

"Adaptive Meshing", ABAQUS 6.4; Analysis User's Manual (6.5 okay), Chapter 7.16.

Khoei and Lewis, "Arbitrary Lagrangian-Eulerian Method, Finite Element Method, Meshing, Remap of State Variables", Developments of Arbitrary Lagrangian-Eulerian Method in Non-Linear Solid Mechanics, Applications to Forming Process, 1999.

Wan et al., "Automated Adaptive Forming Simulations", 12th International Meshing Roundtable (Engineering with Computers 21(1)2005), 2003, pp. 323-334 (47-eoa).

Souli et al., "Ale and Fluid-Structure Interaction Capabilities in Ls-Dyna", 6th International Ls-Dyna Users Conference, 2000, pp. 15.37-15.45.

Khoei et al., "Adaptive Finite Element Remeshing in a Large Deformation Analysis of Metal Powder Forming", International Journal for Numerical Methods in Engineering, 1999, vol. 45, Issue 7, pp. 801-820.

* cited by examiner

FIG. 4
PRE-ANALYSIS

Pre-Deformed Mesh

Fig. 7

FIG. 8
FULL ANALYSIS

Pre-deformed Mesh

Fig. 9

Fig. 10a
(Original Mesh)

Fig. 10b
(1st iteration)

Fig. 10c
(3rd iteration)

SYSTEM AND METHOD FOR DEFORMATION ANALYSIS USING INVERSE PRE-DEFORMATION OF FINITE ELEMENT MESH

CROSS REFERENCE TO RELATED APPLICATIONS

This application claims priority under 35 U.S.C. § 119(e) to U.S. provisional patent application Ser. No. 60/607,916, filed Sep. 8, 2004, entitled "Inverse Pre-Deformation of Finite Element Mesh for Large Deformation Analysis" by Arbtip Dheeravongkit and Kenji Shimada, which is incorporated herein by reference.

BACKGROUND

The present invention relates generally to deformation analysis and, more particularly, to finite element mesh processes used in deformation analysis.

Figures 1A, 1B, 4:
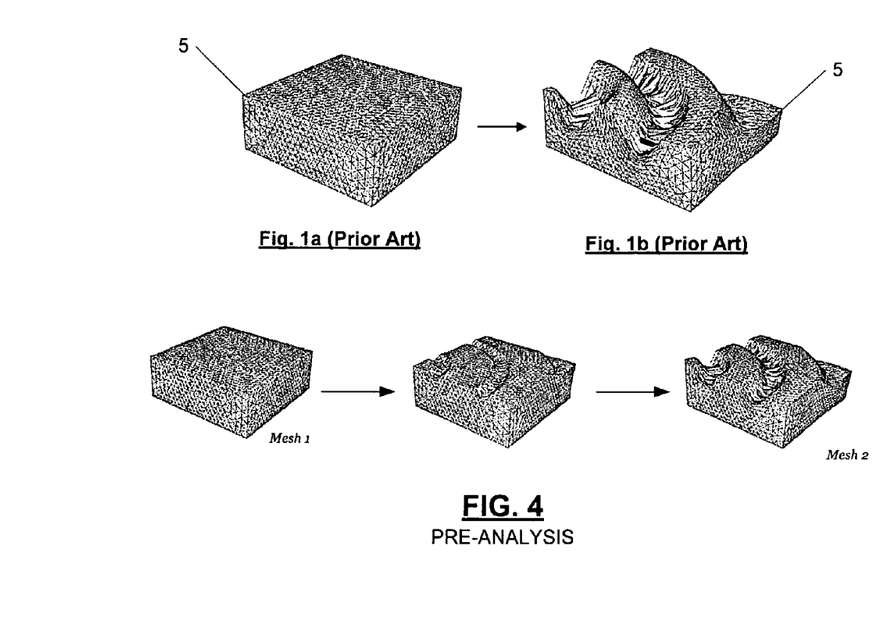
FIGS. 1a-b illustrate an example of a large deformation analysis using a conventional finite element analysis.
FIGS. 4-8 provide an example of a finite element analysis according to embodiments of the present invention.

The process of finite element analysis that deals with large deformation usually produces distorted elements at the later stages of the analysis. These distorted elements lead to several problems; inaccurate results, slow convergence and premature analysis termination. Metal-forming processes are the most common applications involved with large deformation analysis; they include forging, extrusion, rolling, deep drawing, and so on. An example of such large deformation analysis is illustrated in FIGS. 1a-b. This is a three-dimensional forging example in which a sinusoidal die (not shown) deforms a deformable blank 5 into a geometry with high-curvature corners. As the finite element analysis is performed on this problem using a pure Lagrangian method (shown in FIG. 1b), several elements are severely distorted especially around high-curvature corners. Consequently, as can be seen in FIG. 1b, the resulting mesh contains many highly-distorted elements and inverted elements at the later stages, potentially leading to the several problems listed earlier.

There are two conventional techniques for addressing this problem, the adaptive remeshing and the Arbitrary Lagrangian-Eulerian (ALE) techniques. Both techniques, however, have drawbacks.

Adaptive remeshing is a technique which replaces an over-distorted mesh with a better-conditioned mesh when the error approximation of analysis exceeds the tolerance, or the maximum error value allowed. The newly-created mesh may not necessarily have the same topology as the original mesh, and the number of nodes and elements of the new mesh may differ from the original mesh. Therefore, state variables and history-dependent variables must also be transferred from the original to the new mesh. State variables include nodal displacements and variables of the contact algorithm. History-dependent variables are the stress tensor, strain tensor, plastic strain tensor, etc. The adaptive remeshing technique usually completely remeshes the part at every certain number of steps in the analysis. The disadvantage of this method is its high computational cost, especially during the procedure for determining the error estimator and mapping variables from an old to a new mesh. More importantly, computational costs increase considerably for analysis of complicated geometries.

The Arbitrary Lagrangian-Eulerian (ALE) method is another technique for addressing the problem of large deformation in finite element analysis. This method combines the features of pure Lagrangian analysis and Eulerian analysis— two common types of finite element analysis. In pure Lagrangian analysis, a mesh follows the material deformation during analysis; the mesh is connected to the material throughout the finite element calculation. Since the mesh and the material are connected, severe distortion of the mesh can cause difficulty in the finite element calculation. It is here that adaptive remeshing must be applied to improve the shape quality of the mesh in order to continue the analysis. ALE was developed to reduce the repetition of complete remeshing. Essentially, ALE is a Lagrangian analysis that takes advantage of the advection techniques of Eulerian analysis. In the ALE method, the mesh is neither connected to the material nor fixed to a spatial coordinate system. Rather, it is prescribed in an arbitrary manner. During the analysis, the mesh elements deform according to the Lagrangian method. However, instead of repositioning the nodes at their original position and performing advection, as in the Eulerian method, the nodes are placed at other positions to obtain optimal mesh quality. The mesh nodes have velocity associated with them in order to obtain the updated mesh. Mesh velocity plays an important role in the ALE method as it reduces the analysis error and prevents mesh distortion. Another important characteristic of this method is that it changes the location of the nodes in the existing mesh, instead of creating a completely new mesh, like the adaptive remeshing method, and it maintains the same (or similar) mesh topology throughout the analysis. However, because of its complexity, the computation cost is much more expensive than using pure Lagrangian analysis. There are also other limitations in ALE analysis. In many cases the mesh suffers considerable distortion and the same mesh topology cannot be maintained for the entire analysis. In such cases, complete adaptive remeshing is still required. Another drawback of ALE is that the state-variables remapping step is much more complicated than in the Lagrangian method.

SUMMARY OF THE INVENTION

In one general aspect, the present invention is directed to systems and computer-assisted methods for using inverse pre-deformation to generate a deformed (non-uniform) input mesh for deformation analysis. Using this technique, the elements of the deformed input mesh are pre-deformed into shapes that are, for example, approximately inverse to the elements produced by conventional Lagrangian analysis using a uniform input mesh. As a result, the number of inverted and ill-shaped elements generated when using the deformed input mesh can be reduced at the later stage of the analysis when compared to conventional Lagrangian analysis using a uniform input mesh.

According to various embodiments, the method may include the step of performing a partial analysis (referred to as a "pre-analysis") on the object subject to the deformation analysis to generate a deformed boundary for the object from an undeformed boundary for the object. Next, the method may include the step of generating the deformed input mesh for the object based on the geometric and strain information from the pre-analysis step. Next, the node locations from the deformed mesh are mapped to the undeformed boundary for the object so that a full analysis can be performed on the undeformed boundary of the object using the deformed input mesh.

In various implementations, bubble analysis may be used to generate the deformed input mesh from the information generated in the pre-analysis step. Also, the pre-analysis step may be performed, for example, until the elements experience sever distortion or until a certain percentage (e.g., between 50% and 80%) of a complete analysis is performed. Further, the inverse pre-deformation process can be used for both two and three dimensional problems. For two dimensional problems, inverse bilinear mapping may be used to map the node locations of the deformed mesh to the undeformed boundary of the object. For three dimensional problems, barycentric interpolation may be used for the mapping step.

Since the deformed input mesh may be generated using the deformed boundary of the object from an intermediate stage of the pre-analysis, the shape quality of the resulting mesh (following the complete analysis using the deformed input mesh) tends to improve until the maximum point is reached around the stage at which the boundary is taken. Then, the shape quality may degrade. Therefore, the inverse pre-deformation process may be also be utilized in an iterative manner. That is, for example, the results of the analysis from the first deformed input mesh may be used to generate a second deformed input mesh for further analysis, and so on. Thus, in cases where the geometry of the problem is complicated, performing the inverse pre-deformation technique just once may not provide sufficient results. Subsequent iterations may, therefore, be performed until the desired results are obtained.

FIGURES

Various embodiments of the present invention are described herein by way of example with reference to the following figures, wherein.

DETAILED DESCRIPTION OF THE INVENTION

Various embodiments of the present invention are directed to systems and computer-assisted methods for finite element analysis that employ inverse pre-deformation to generate, in one embodiment, a deformed input mesh for multi-dimensional Lagrangian deformation analysis. The inverse pre-deformation produces a pre-deformed mesh whose element shapes are, for example, approximately inverse from the shapes into which they will be deformed during the analysis. Accordingly, the new deformation analysis, run on the pre-deformed input mesh, can reduce the chance of inverted elements at later stages of the analysis and decrease the possibility of premature analysis termination. The inverse pre-deformation is applicable for both two-dimensional and three-dimensional problems.

Figure 2:
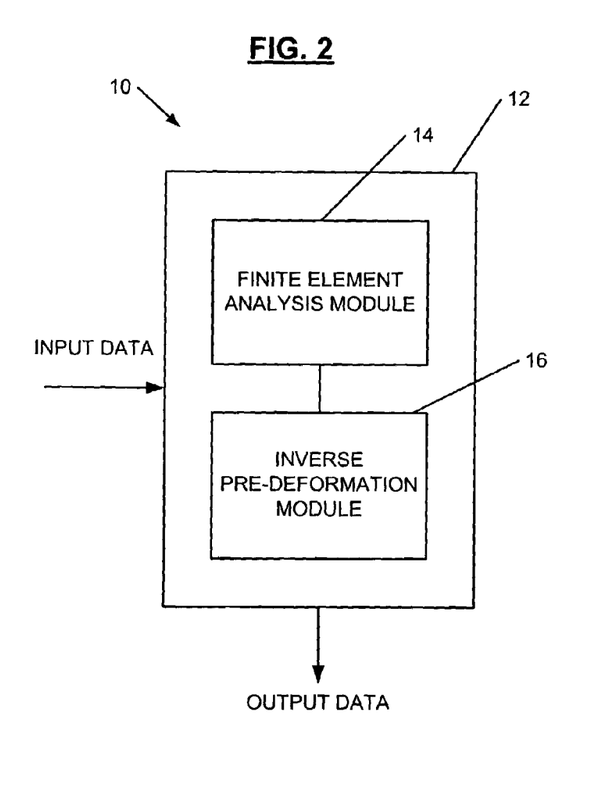
FIG. 2 illustrates a computer system according to various embodiments of the present invention.

FIG. 2 is a diagram of a system 10 according to various embodiments of the present invention. The system 10 includes a computer system 12 comprising a finite element analysis module 14 and an inverse pre-deformation module 16. The computer system 12 may be implemented as one or a number of networked computer devices. The finite element analysis module 14 may perform finite element analysis for a deformable object using, for example, the Lagrangian method or a variant of the Lagrangian method, such as may be used in large deformation analysis, based on input data regarding the deformable object and the deformation process. For example, a finite element package from ABAQUS, Inc. may be used for the finite element analysis module 14. The input data may include, for example, computer-aided-design information about the object and the deformation process.

The inverse pre-deformation module 16, as described further below, may generate, based on a partial analysis by the finite element analysis module 14 (a "pre-analysis"), a deformed input mesh to be used by the finite element analysis module 14 in a subsequent analysis of the object. The elements of the deformed mesh are, in various embodiments, approximately opposite of those produced by the pre-analysis. As a result, the number of ill-shaped and inverted elements can be reduced at later stages of the analysis. The output data from the computer system 12 may include boundary shape and stress information for the deformed object.

The modules 14 and 16 may be implemented as software code to be executed by a processor of the computer system 12 using any suitable computer instruction type. The software code may be stored as a series of instructions or commands, or as a program, on a computer readable medium. The input data may be stored in a database (not shown) associated with the computer system 12 or may be retrieved from a file. The output data may also be stored in a database and/or in a file. Graphical displays of the output data may also be generated and displayed to a user of the computer system 12.

Figure 3:
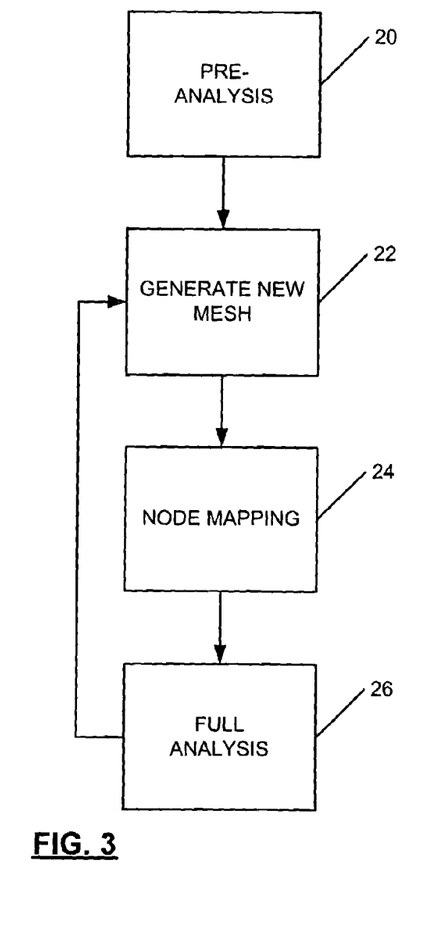
FIG. 3 illustrates a process flow through the computer system of FIG. 2 according to various embodiments of the present invention.

FIGS. 3 through 8 illustrate an embodiment of the process performed by the computer system 12 according to various embodiments of the present invention. As shown in FIG. 3, at step 20, the finite element analysis module 14 may perform a pre-analysis using, for example, a uniform mesh input, to predict the deformation behavior by collecting node locations and equivalent strain, which gives the deformation intensity information regarding the deformed part. Quadratic tetrahedral elements are preferably used for the input mesh as they can ordinarily tolerate more severe distortion than linear elements.

The primary goal of the pre-analysis is to predict deformation behavior and collect necessary information, e.g., deformed boundary information and equivalent strain, which will be used in the later pre-deformation steps. Thus, according to various embodiments, the pre-analysis step can be carried out until, for example, 50%-80% of a complete analysis is performed, or until severe distortion of the finite elements starts occurring. Furthermore, two mesh data sets may be maintained in this step; the initial undeformed mesh (referred to as "Mesh 1"), and the deformed mesh (referred to as "Mesh 2"). However, to facilitate the node mapping process in a later step, each quadratic tetrahedral element in Mesh 1 and Mesh 2 may be subdivided into eight linear tetrahedral elements, according to various embodiments.

FIG. 4 shows an example of the pre-analysis step 20 performed on a three-dimensional block with a uniform mesh that is subject to a sinusoidal die (as in the example of FIG. 1).

As can be seen in this figure, the uniform mesh may be subjected to a conventional, but partial, analysis, with the pre-analysis aborted when severe distortion of the elements starts occurring. According to other embodiments, as mentioned above, the pre-analysis may be aborted after a certain percentage of the complete analysis is carried out, such as between 50% and 80% of the complete analysis.

Referring back to FIG. 3, next, at step 22, the inverse pre-deformation module 16 may generate a new mesh for the deformed object obtained from the pre-analysis step 20. According to various embodiments, a bubble packing algorithm may be used to generate a new tetrahedral mesh. Details regarding bubble mesh algorithms can be found in the following references, which are incorporated herein by reference:

Kenji Shimada and David C. Gossard, "Bubble Mesh: Automated Triangular Meshing of Non-Manifold Geometry by Sphere Packing", *Proceedings of The Third ACM Symposium on Solid Modeling and Applications*, pp. 409-419, 1995.

Kenji Shimada, Atsushi Yamada, and Takayuki Itoh, "Anisotropic Triangular Meshing of Parametric Surfaces via Close Packing of Ellipsoidal Bubbles", *6th International Meshing Roundtable*, Sandia National Laboratories, pp. 375-390, 1997.

Soji Yamakawa and Kenji Shimada, "High Quality Anisotropic Tetrahedral Mesh Generation via Ellipsoidal Bubble Packing", Proceedings, *9th International Meshing Roundtable*, Sandia National Laboratories, pp. 263-273, 2000.

Kenji Shimada, Jia-Huei Liao and Takayuki Itoh, "Quadrilateral Meshing with Directionality Control through the Packing of Square Cells", Proceedings, *7th International Meshing Roundtable*, Sandia National Lab, pp. 61-76, 1998.

Naveen Viswanath, "Adaptive Anisotropic Quadrilateral Mesh Generation Applied to Surface Approximation", MS Thesis, Carnegie Mellon University, 2000.

In other embodiments, different mesh algorithms may be used to generate the mesh for the deformed object obtained from the pre-analysis step 20.

Figure 5:
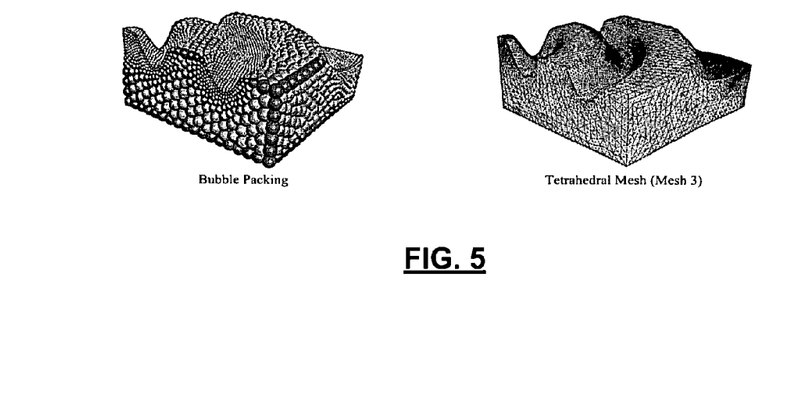

When generating a tetrahedral mesh at step 22, the element sizes should be properly determined. Ideally, smaller elements are desirable around the high-curvature corner regions of the deformed object, where the elements tend to experience more distortion. For this reason, a tetrahedron mesher that can control the element sizes precisely is preferable. Bubble Mesh can achieve this by utilizing the equivalent strain information collected from the pre-analysis step to control the mesh sizes over the whole domain through the grid-based tensor function. In order to do this, a background grid may first be defined over the domain, where the grid size is properly determined for each problem. Mesh sizes are then stored at the grid nodes corresponding to the values of the equivalent strain. Smaller element sizes are specified where the equivalent strain values are higher such as around the high-curvature corners. For the internal point of a grid cell, Bubble Mesh calculates the mesh size by linear interpolation of the values at four grid nodes. Bubble Mesh packs the sphere bubbles closely inside the boundary of the deformed blank using sizes specified in the tensor function to control the size of the bubbles. The mesh nodes are placed at the centers of the bubbles and are then connected by, for example, Delaunay triangulation and tetrahedrization, to generate the tetrahedral mesh. FIG. 5 illustrates a bubble packing process with size control. The data set from the step (referred to as "Mesh 3") is also maintained.

Referring again back to FIG. 3, next, at step 24, the inverse pre-deformation module 16 may map the node locations from the deformed boundary generated at step 22 to an undeformed boundary for the object. That is, the new nodes created at step 22 are mapped from the deformed blank onto the undeformed blank to generate a pre-deformed mesh using, for example, barycentric interpolation for three-dimensional problems or an inverse bilinear mapping for two-dimensional problems. In this step, the original deformed mesh (Mesh 2) is preferably compared with the optimal mesh generated by step 22 (Mesh 3) and the position of each of Mesh 3's node on Mesh 2 is located using the interpolation function. Practically, for each of Mesh 3's node, Mesh 2 may be searched for the element in which this node lies. In tetrahedral elements, barycentric interpolation is preferably used to discover if the interested node is inside or outside the elements.

Barycentric interpolation is a form of tetrahedral interpolation, and barycentric coordinates are the numbers corresponding to the weights placed at the vertices of a tetrahedron. These numbers can be used to determine the location of the center of mass of the tetrahedron corresponding to the weights put on its vertices. Let $V_i$ (i=1,2,3,4) be the vertices of tetrahedron T. Any point P in three-dimensional space can be expressed as $$P=\theta_1 V_1+\theta_2 V_2+\theta_3 V_3+\theta_4 V_4, \quad (1)$$

where $\theta_i$'s are the barycentric coordinates for point P, and $$\theta_1+\theta_2+\theta_3+\theta_4=1. \quad (2)$$

And point P is inside the tetrahedron if $$\theta_i>0 \ i=1,2,3,4. \quad (3)$$

In this analysis, point P is a mesh node of Mesh 3, and tetrahedron T is a tetrahedral element of Mesh 2. Thus, $V_i$ and P are known variables in Eqn. (1), and the barycentric coordinates $\theta_i$'s are the numbers to be determined. Since the Eqn. (1) can be decomposed into three sub-equations for x, y, and z coordinates, along with Eqn. (2), there are four equations to be solved for the four barycentric coordinates. Nevertheless, as Mesh 2 is searched for each element that each Mesh 3 node lies inside, the calculated values of barycentric coordinates associated with that node and the element that is found are maintained.

Figure 6:
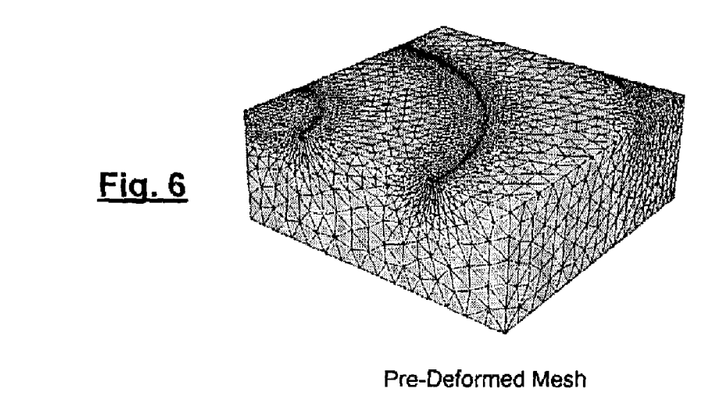
Figure 7:
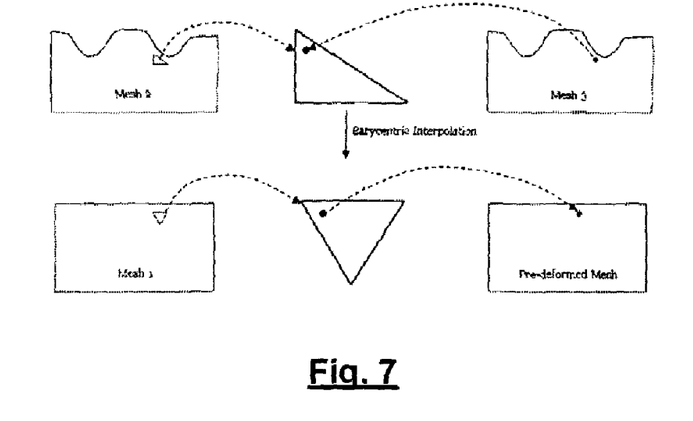

Recall that the initial undeformed mesh (Mesh 1) is deformed into Mesh 2, and both meshes have the same topology. In addition, the element of Mesh 2 that each Mesh 3 node lies inside is also known. Therefore, each of these Mesh 3 nodes can be mapped onto Mesh 1 using Eqn. (1), where $\theta_i$'s and $V_i$ are now the known variables, and P is the location of the node to be determined on the undeformed boundary. By mapping all the Mesh 3 nodes onto Mesh 1, the result is a pre-deformed mesh, such as shown in FIG. 6. FIG. 7 depicts an example of the node mapping process of step 24 in two dimensions.

Figure 8:
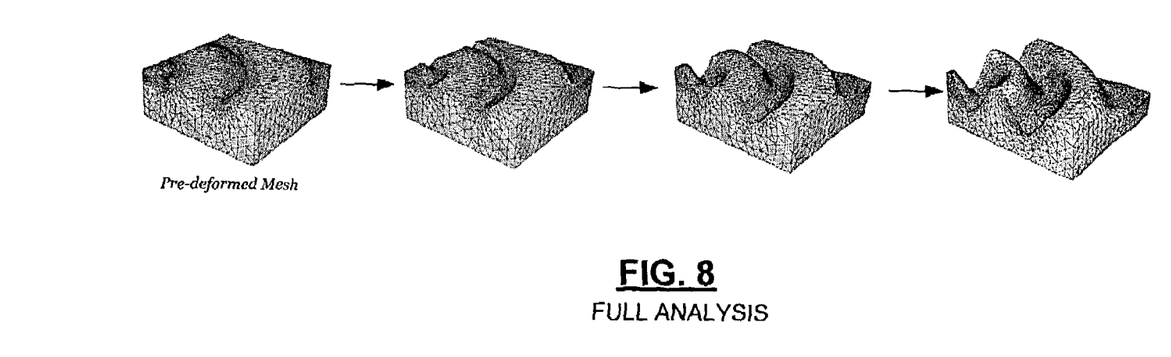

Referring again back to FIG. 3, next, at step 26, a full analysis is performed by the finite element analysis module 14 on the pre-deformed mesh obtained from step 24. Since the pre-deformed mesh is generated using the deformed boundary of the intermediate stage in the pre-analysis, the shape quality of the resulting mesh from the full analysis of step 26 tends to improve until the maximum point is reached around the stage at which the boundary in the pre-analysis was taken; then the shape quality starts to degrade, as shown in the example of FIG. 8. Again, a pure Lagrangian analysis or a variant Lagrangian analysis may be used for this step.

Further, as shown in FIG. 3, the process can be repeated iteratively. That is, in some embodiments, the pre-deformed result of step 26 can be used to generate a subsequent deformed mesh at step 22 for a subsequent iteration. In some instances, acceptable results may be obtained after one iteration, although in other cases a number of iterations may be performed.

Figure 9:
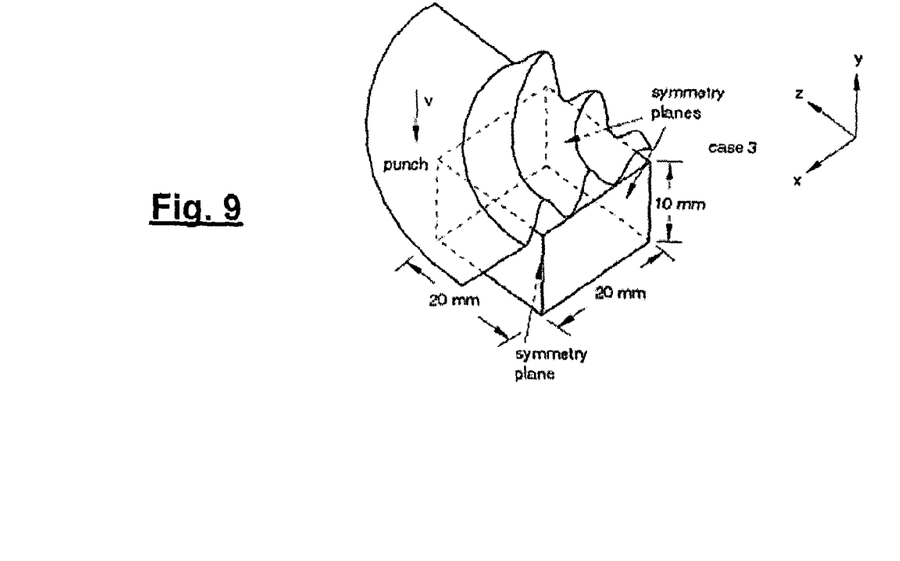
FIG. 9 illustrates the model geometry for a test problem.

The following provides an example of the pre-inverse deformation process for a three-dimensional deformable block. The model consists of a sinusoidal rigid die and a 20 mm by 10 mm by 20 mm deformable blank. The bottom of the blank is constrained in the y-direction, and symmetry boundary conditions are applied at the x=0 and z=10 planes. The die has a sinusoidal shape with amplitude and period of 5 and 10 mm, respectively. The material of the blank is steel and modeled as a von Mises elastic-plastic material with a Young's modulus of 200 GPa, an initial yield stress of 100 MPa, and a constant hardening slope of 300 MPa. The Poisson's ratio is 0.3 and the density is 7800 kg/m³. The die is moved downward vertically at a velocity of 2000 mm/sec and is constrained in all other degrees of freedom. FIG. 9 shows the model geometry of the test problem.

Figure 10A:
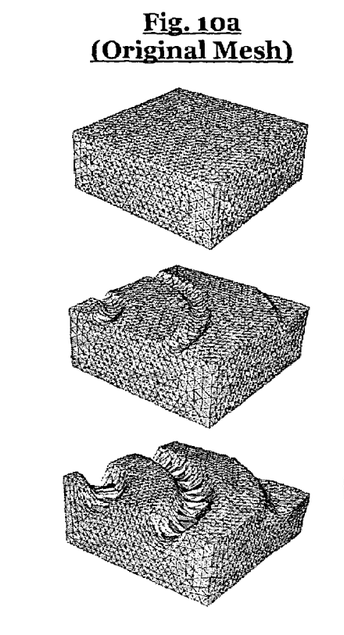
FIGS. 10a-c show the finite element analysis results of the original mesh, the first iteration pre-deformed mesh and the third iteration pre-deformed mesh, respectively, for the test problem.
Figure 10B:
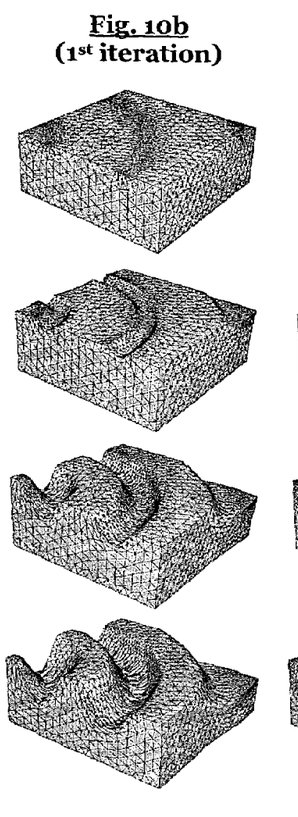
Figure 10C:
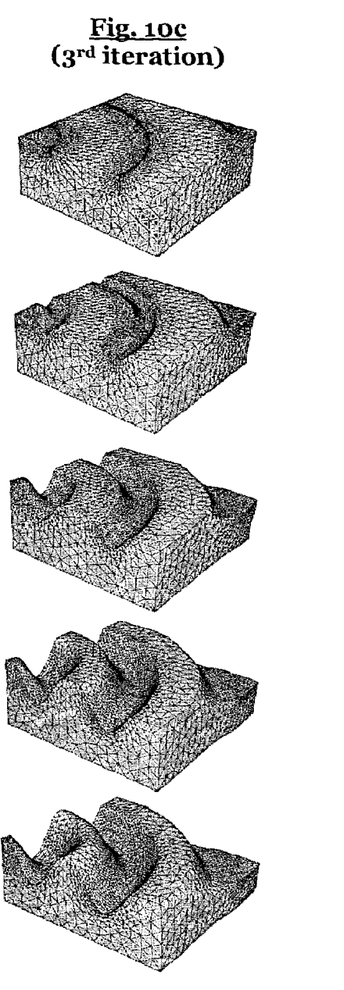
Figure 11:
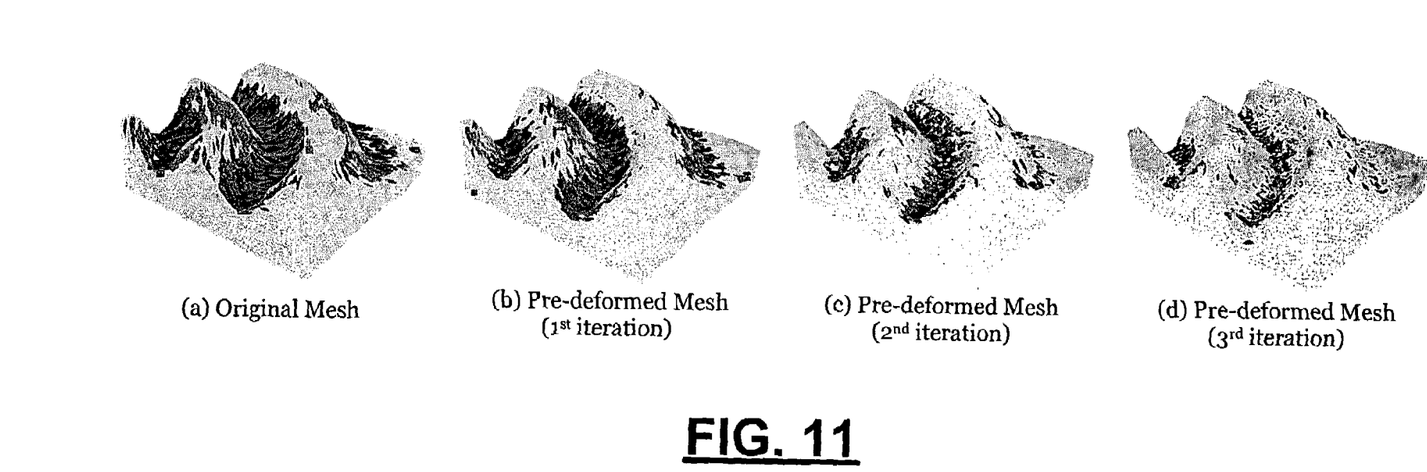
FIGS. 11a-d illustrate the elements with radius ratio greater than 50 at step 18 for the original and pre-deformed meshes, respectively, for the test problem.

Three iterations of the inverse pre-deformation were run on this test problem, as shown in FIGS. 10a-c. The second iteration used the result in step 9 of the first iteration as the starting mesh, and the third iteration used the result in step 11 of the second iteration as the starting mesh. The frames of FIGS. 10b and 10c show the resultant pre-deformed mesh for the first and third iterations respectively. It is shown that the pre-deformed meshes can capture the feature areas of large deformation and pre-deform the elements, as well as refine the element sizes around those locations successfully. Furthermore, these feature areas can be captured more accurately in the later pre-deforming iterations.

The results from the analyses of the pre-deformed meshes were compared with the results from the analysis of the original mesh. FIGS. 10a-c show the finite element analysis results of the original mesh, the first iteration pre-deformed mesh and the third iteration pre-deformed mesh, respectively. As shown in FIG. 10a, the original mesh begins to produce ill-shaped elements at a very early stage, while the pre-deformed meshes (FIGS. 10b and 10c) can extend the life of the analysis to the later stages. This is because the thin and fine elements in the pre-deformed meshes, which were intentionally generated at locations expected to encounter high-curvature corners during analysis, gradually unfold as the analysis continues. Consequently, the shapes of the elements tend to improve progressively during the analysis, until at some point in the later analysis steps, element shape quality would begin to degrade.

To compare shape quality of the meshes during analysis of the original mesh and pre-deformed meshes, the radius ratios are computed. The radius ratio $\rho$ is defined as the ratio of the inradius $\rho_{in}$ and circumradius $\rho_{out}$ of a tetrahedron. The values of $\rho_{in}$ and $\rho_{out}$ can be calculated as $$\rho_{in} = 3v \bigg/ \sum_{i=0}^{3} s_i, \tag{4}$$

$$\rho_{out} = \frac{\sqrt{(a+b+c)(a+b-c)(a+c-b)(b+c-a)}}{24v}. \tag{5}$$

Then, $$\rho = 3\frac{\rho_{in}}{\rho_{out}} = \frac{216v^2}{\sqrt{(a+b+c)(a+b-c)(a+c-b)(b+c-a)} \sum_{i=0}^{3} s_i}, \tag{6}$$

where a, b and c are the products of the lengths of opposite edges of a tetrahedron. The optimal value of radius ratio is 1 and a high value of radius ratio indicates an ill-shaped tetrahedron. Table 1 below shows the percentage of the total elements that have radius ratio greater than 50 at various analysis steps in the test problem.

TABLE 1

Percentage of total elements that have radius ratio greater than 50

| Step | Original mesh (%) | 1st iteration Pre-deformed mesh (%) | 2nd iteration Pre-deformed mesh (%) | 3rd iteration Pre-deformed mesh (%) |
|---|---|---|---|---|
| 3 | 0.08 | 0.07 | 0.42 | 0.47 |
| 6 | 0.31 | 0.14 | 0.30 | 0.19 |
| 9 | 0.56 | 0.40 | 0.33 | 0.13 |
| 12 | 0.90 | 0.79 | 0.54 | 0.15 |
| 15 | 1.32 | 1.30 | 0.93 | 0.28 |
| 18 | 1.90 | 1.90 | 1.51 | 0.55 |

According to Table 1, the increasing percentage of original mesh elements implies that the overall shape quality of the original mesh degrades as the analysis continues. The result of the first iteration pre-deformed mesh is obviously improved as fewer number of elements have large radius ratio. In the second and third iterations, the pre-deformed meshes start with more elements having large radius ratio, because many elements are deformed in advance to reduce the severe element distortion expected during analysis. Nevertheless, after only a few analysis steps, the shape quality of the pre-deformed meshes improves rapidly, and the pre-deformed mesh results become better than the original mesh results. FIGS. 11a-d illustrate the elements with radius ratio greater than 50 at step 18 for the original and pre-deformed meshes.

As mentioned above, the pre-deformation technique may also be used for two-dimensional problems. For a two-dimensional problem, inverse bilinear mapping may be used at step 24 to generate a quadrilateral mesh. Also, because the deformation behavior of a three-dimensional problem is usually more complicated than a two-dimensional problem, there are more chances that one iteration of the process might be enough for adequate results.

Figure 12A:
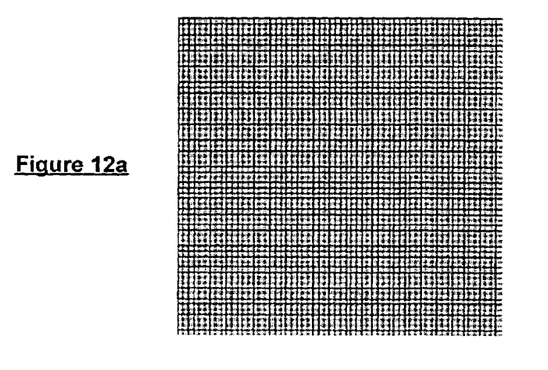
FIGS. 12a-e illustrate an overview of the two-dimensional inverse-predeformation process according to various embodiments of the present invention.
Figure 12B:
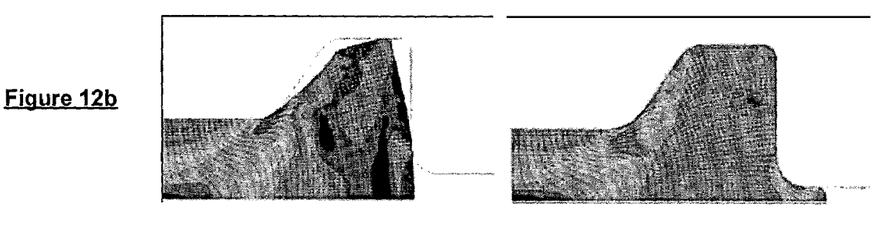
Figure 12C:
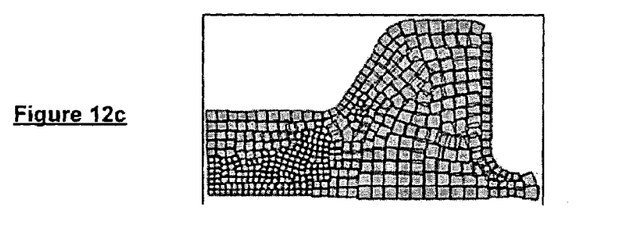

FIGS. 12a-e illustrate an overview of the two-dimensional inverse-predeformation process. The process starts with a uniform mesh, as shown in FIG. 12a. Pre-analysis is carried out to give the boundary shape and stress information for the deformed blank. The pre-analysis may be a partial Lagrangian analysis, carried out, for example, until severe distortion of the elements occur or when 50-80% of the full analysis is completed, as shown in FIG. 12b. Next, a new mesh (preferably a quadrilateral mesh) is created using the deformed boundary generated from the pre-analysis step. Again, a bubble mesh algorithm may be used for this step. The result of this step, as shown in FIG. 12c, is a new graded quadrilateral mesh inside the pre-deformed boundary. FIGS. 13a-c illustrate an example of the bubble mesh process.

After optimal node locations have been located inside the pre-analysis deformed boundary, it is possible to map the new node locations back to the initial boundary (step 24 of FIG. 3). To achieve this, the relationship between the old node locations in the initial boundary and the new node locations in the deformed boundary may be used, applying inverse bilinear mapping.

In inverse bilinear mapping, let (x,y) be the coordinate of the source space and (u,v) be the coordinate of the destination space.

$$x = auv + bu + cv + d, \text{ and} \quad (7)$$

$$y = euv + fu + gv + h, \quad (8)$$

where a, b, c, d, e, f, g and h are constants. Solving for v in Equation 7, then substituting in Equation 8, the following is obtained:

$$(au+c)(fu+h-y)-(eu+g)(bu+d-x)=0, \text{ or}$$

$$Au^2 + Bu + C = 0. \quad (9)$$

Similarly, solving for u in the Equation 8, then substituting in the Equation 7, the following is obtained:

$$(av+b)(gv+h-y)-(ev+f)(cv+d-x)=0, \text{ or}$$

$$Dv^2 + Ev + F = 0. \quad (10)$$

Equation 9 gives two solutions and Equation 10 gives another set of two solutions.

$$u = \frac{-B \pm \sqrt{B^2 - 4AC}}{2A}, v = \frac{x - bu - d}{au + c}, \text{ and}$$

$$v = \frac{-E \pm \sqrt{E^2 - 4DF}}{2D}, u = \frac{y - bv - h}{ev + f}$$

However, since all of the master elements are non-concave, and only one unique solution is valid for the range of $0 \leq u \leq 1$ and $0 \leq v \leq 1$, a unique solution is obtained.

Figure 14:
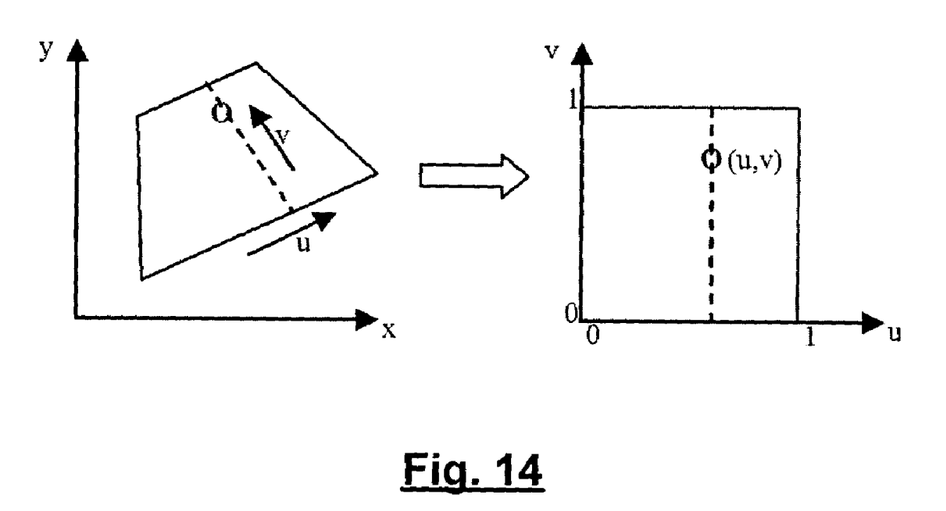
FIG. 14 illustrates the inverse bilinear mapping process according to various embodiments of the present invention.

In summary, it must first be determined in the deformed boundary in which old element $e_i$, each new node $n_j$ lays. Next the u and v vectors must be calculated to give the location of this new node $n_j$, inside the old element $e_i$. Then inverse bilinear mapping can be performed to map this new node from the deformed boundary to the undeformed boundary, using the calculated vector u and v, as shown in FIG. 14.

Figure 12D:
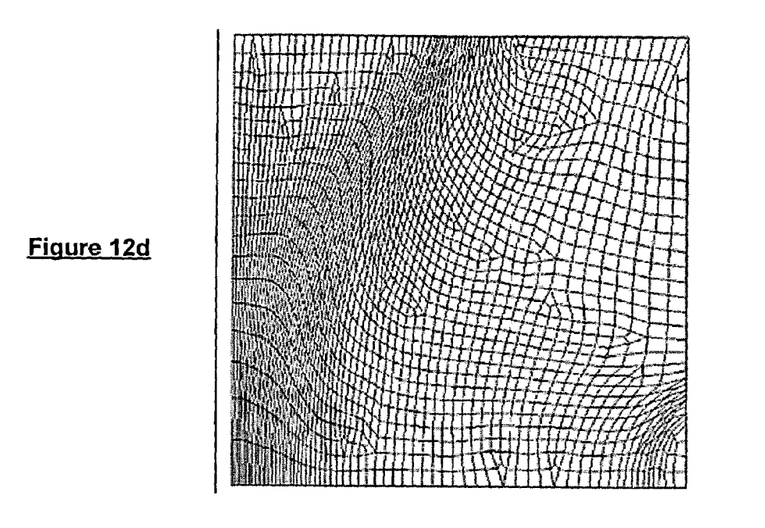
Figure 12E:
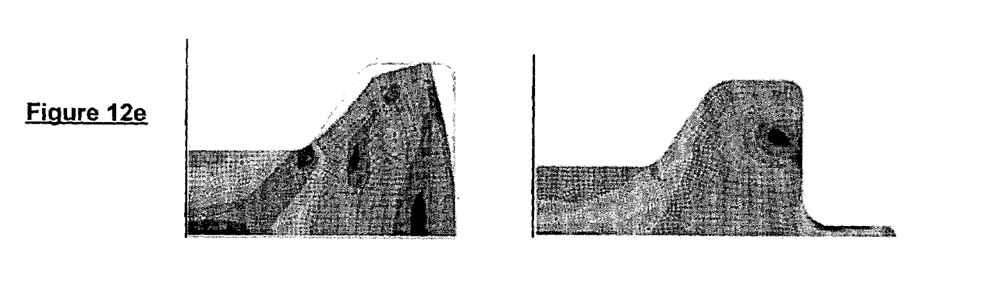
Figure 13A:
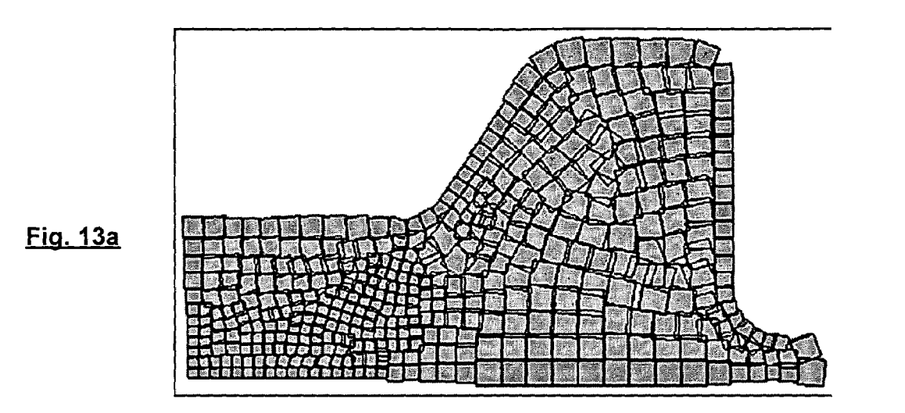
FIGS. 13a-c illustrate an example of the bubble mesh process for a two-dimensional problem according to various embodiments of the present invention.
Figure 13B:
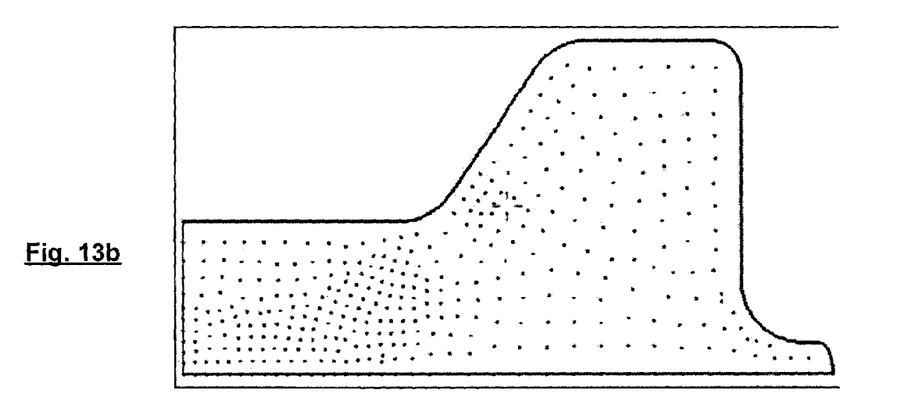
Figure 13C:
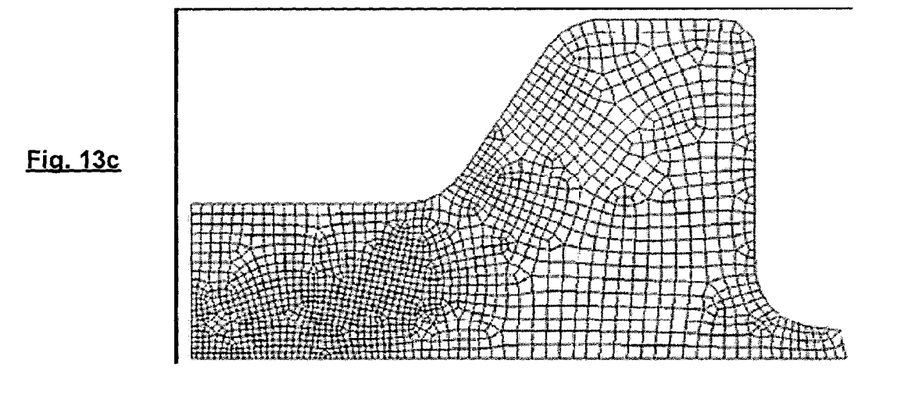

The result of the node mapping step is a new pre-deformed mesh inside the initial boundary, as shown in FIG. 12d. The full analysis may then be run on the new pre-deformed mesh, as shown in FIG. 12e. A Lagrangian-type analysis may be used for this step, using, for example, one of a number of different commercially-available finite element mesh programs. Also, as with the three-dimensional process, the steps of the two-dimensional process may be repeated.

While several embodiments of the invention have been described, it should be apparent, however, that various modifications, alterations and adaptations to those embodiments may occur to persons skilled in the art with the attainment of some or all of the advantages of the invention. It is therefore intended to cover all such modifications, alterations and adaptations without departing from the scope and spirit of the present invention as defined by the appended claims.

What is claimed is:

1. A computer-assisted finite element analysis method for analyzing deformation to a deformable object comprising:

performing, by a computer system, a first, partial deformation analysis, using a first mesh, on an undeformed boundary for the object to generate a deformed boundary for the object;

generating, by the computer system, a second mesh, different from the first mesh, for the deformed boundary of the object generated by the first, partial deformation analysis, wherein the second mesh is bounded by the deformed boundary of the object and comprises grid nodes;

mapping, by the computer system, the grid node locations from the second mesh for the deformed boundary of the object to the undeformed boundary for the object to generate a third mesh for the object that is bounded by the undeformed boundary of the object; and performing, by the computer system, a second deformation analysis on the undeformed boundary of the object using the third mesh to generate a second deformed boundary for the object.

2. The method of claim 1, wherein the step of generating the second mesh includes using strain information from the first deformation analysis to determine the size of the elements of the second mesh.

3. The method of claim 2, wherein the step of using strain information from the first deformation analysis to determine the size of the elements of the second mesh includes using a bubble mesh algorithm.

4. The method of claim 3, wherein the second mesh includes tetrahedral elements.

5. The method of claim 1, wherein the step of mapping the grid node locations includes using barycentric interpolation to map the grid node locations of the second mesh to the undeformed boundary of the object.

6. The method of claim 1, wherein the step of mapping the grid node locations includes using inverse bilinear mapping to map the grid node locations of the second mesh to the undeformed boundary of the object.

7. The method of claim 1, wherein the step of performing the first, partial deformation analysis includes performing deformation analysis until elements of the first mesh experience severe distortion.

8. The method of claim 1, wherein the step of performing the first, partial deformation analysis includes performing between 50% and 80% of a complete analysis.

9. The method of claim 1, further comprising:

generating a fourth mesh for the object that is based on and bounded by the second deformed boundary for the object generated from the second deformation analysis;

mapping grid node locations from the fourth mesh to the undeformed boundary for the object to generate a fifth mesh for the object that is bounded by the undeformed boundary for the object; and performing a third deformation analysis on the undeformed boundary of the object using the fifth mesh.

10. The method of claim 1, wherein performing the first, partial deformation analysis includes performing a partial Lagrangian analysis.

11. The method of claim 1, wherein performing the second deformation analysis on the undeformed boundary of the object using the third mesh includes performing a Lagrangian analysis.

12. A system for performing finite element analysis to analyze deformation to a deformable object comprising:

a processor; and a computer readable medium that stores instructions that, when executed by the processor, cause the processor to:

perform a first, partial deformation analysis on an undeformed boundary for the object, using a first mesh, to generate a deformed boundary for the object;

generate a second mesh for the deformed boundary of the object generated by the first, partial deformation analysis, wherein the second mesh is different from the first mesh, is bounded by the deformed boundary of the object, and comprises grid nodes;

map the gird node locations from the second mesh for the deformed boundary of the object to the undeformed boundary for the object to generate a third mesh for the object that is bounded by the undeformed boundary of the object; and perform a second deformation analysis on the undeformed boundary of the object using the third mesh to generate a second deformed boundary for the object.

13. The system of claim 12, wherein strain information from the first, partial deformation analysis is used to determine the size of the elements of the second mesh.

14. The system of claim 12, wherein a bubble mesh algorithm is used to determine the size of the elements of the second mesh based on the strain information.

15. The system of claim 12, wherein barycentric interpolation is used to map the grid node locations of the second mesh to the undeformed boundary of the object.

16. The system of claim 12, wherein inverse bilinear mapping is used to map the grid node locations of second mesh to the undeformed boundary of the object.

17. The system of claim 12, wherein the computer readable medium further stores instructions that when executed by the processor causes the processor to:

generate a fourth mesh for the object that is based on and bounded by the second deformed boundary for the object generated from the second deformation analysis;

map grid node locations from the fourth mesh to the undeformed boundary for the object to generate a fifth mesh for the object that is bounded by the undeformed boundary of the object; and perform a third deformation analysis on the undeformed boundary of the object using the fifth mesh.

18. A computer readable medium having instructions stored thereon which, when executed by a processor, cause the processor to:

perform a first, partial deformation analysis, using a first mesh, on an undeformed boundary for an object to generate a deformed boundary for the object;

generate a second mesh for the object that is based on and bounded by the deformed boundary for the object, wherein the second mesh is different from the first mesh and comprises grid nodes;

map the grid node locations from the second mesh for the deformed boundary of the object to the undeformed boundary for the object to generate a third mesh for the object that is bounded by the undeformed boundary for the object; and perform second deformation analysis on the undeformed boundary of the object using the third mesh to generate a second deformed boundary for the object.

19. The computer readable medium of claim 18, having further stored thereon instructions, which when executed by the processor, cause the processor to use strain information from the first deformation analysis to determine the size of the elements of the second mesh.

20. The computer readable medium of claim 19, having further stored thereon instructions, which when executed by the processor, cause the processor to use a bubble mesh algorithm to determine the size of the elements of the second mesh based on the strain information.

21. The computer readable medium of claim 18, having further stored thereon instructions, which when executed by the processor, cause the processor to use barycentric interpolation to map the grid node locations of the second mesh to the undeformed boundary of the object.

22. The computer readable medium of claim 18, having further stored thereon instructions, which when executed by the processor, cause the processor to use inverse bilinear mapping to map the grid node locations of the second mesh to the undeformed boundary of the object.

23. The computer readable medium of claim 18, having further stored thereon instructions, which when executed by the processor, cause the processor to:

generate a fourth mesh for the object that is based on and bounded by the second deformed boundary generated from the second deformation analysis;

map grid node locations from the fourth mesh to the undeformed boundary for the object to generate a fifth mesh for the object that is bounded by the undeformed boundary for the object; and perform a third deformation analysis on the undeformed boundary of the object using the fifth mesh.

24. The method of claim 1, further comprising storing output data from the second deformation analysis in a database.

* * * * *